United States Patent
Dave et al.

(10) Patent No.: US 10,396,835 B2
(45) Date of Patent: Aug. 27, 2019

(54) SYSTEM AND METHOD FOR REDUCING NOISE FROM TIME DIVISION MULTIPLEXING OF A CELLULAR COMMUNICATIONS TRANSMITTER

(71) Applicant: Apple Inc., Cupertino, CA (US)

(72) Inventors: Ruchir M. Dave, San Jose, CA (US); Ashrith Deshpande, San Jose, CA (US); Vasu Iyengar, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/625,999

(22) Filed: Jun. 16, 2017

(65) Prior Publication Data

US 2018/0367172 A1    Dec. 20, 2018

(51) Int. Cl.
*H04M 1/02* (2006.01)
*H04B 1/04* (2006.01)
*H04M 1/60* (2006.01)
*H04J 3/14* (2006.01)

(52) U.S. Cl.
CPC ........ *H04B 1/0475* (2013.01); *H04M 1/6008* (2013.01); *H04J 3/14* (2013.01); *H04M 1/0202* (2013.01)

(58) Field of Classification Search
CPC ............................ H04M 3/2236; H04M 3/568
See application file for complete search history.

(56) References Cited

U.S. PATENT DOCUMENTS

| | | | |
|---|---|---|---|
| 7,702,118 B2 | 4/2010 | Park et al. | |
| 8,121,551 B2 | 2/2012 | Lee | |
| 8,913,961 B2 | 12/2014 | Prather et al. | |
| 9,113,239 B2 | 8/2015 | Kim | |
| 9,172,791 B1 | 10/2015 | Ayrapetian et al. | |
| 9,770,382 B1* | 9/2017 | Ellis | H04W 4/80 |
| 2008/0101635 A1* | 5/2008 | Dijkstra | H04R 25/30 381/315 |
| 2011/0044481 A1* | 2/2011 | Marquis | H04R 25/405 381/313 |
| 2012/0250881 A1 | 10/2012 | Mulligan | |
| 2013/0051574 A1 | 2/2013 | Yoo | |
| 2014/0278394 A1* | 9/2014 | Bastyr | G10L 21/0208 704/233 |
| 2015/0049885 A1 | 2/2015 | Oestlund | |

* cited by examiner

*Primary Examiner* — Edan Orgad
*Assistant Examiner* — Emmanuel K Maglo
(74) *Attorney, Agent, or Firm* — Womble Bond Dickinson (US) LLP

(57) ABSTRACT

Systems and methods for reducing effects of time-division multiplexing noise in mobile communications devices. When cellular communication with time-division multiplexing is detected, such as Global System for Mobiles (GSM) communication with Time Division Multiple Access (TDMA) protocol, total energy and energy at a repetition frequency of the time division multiplexing is measured in audio signals received from several microphones located in the device. A control signal indicating microphones affected by TDMA noise is provided to signal processing subsystems that receive audio signals from the microphones. A beam former circuit may combine two or more audio signals to produce beam formed signals. The control signal may further indicate beam formed signals affected by TDMA noise based on a ratio of the energy from the repetition frequency to the total energy in the beam formed signals.

22 Claims, 3 Drawing Sheets

SYSTEM AND METHOD FOR REDUCING NOISE FROM TIME DIVISION MULTIPLEXING OF A CELLULAR COMMUNICATIONS TRANSMITTER

BACKGROUND

Field

Embodiments of the invention relate to the field of mobile cellular communications device; and more specifically, to reduction of TDMA noise in GSM devices.

Background

Global System for Mobile communications (GSM) is a digital cellular technology used for transmitting mobile voice and data services. GSM uses digital technology and Time Division Multiple Access (TDMA) transmission methods. TDMA shares a single radio channel by dividing the channel into time slots that are shared between simultaneous users of the radio channel.

The GSM system has a defined GSM frame structure to enable the orderly passage of information. The GSM frame structure establishes schedules for the predetermined use of TDMA timeslots. A GSM frame includes eight timeslots, each used for a different user. The timeslots for transmission and reception for a given mobile cellular communications device are offset in time so that the mobile device does not transmit and receive at the same time. A GSM frame is approximately 4.615 mSec. (120/26 mSec.) long. A GSM frame is divided into eight burst periods, each approximately 0.577 mSec. (15/26 mSec.) long. Therefore a mobile cellular communications device will turn on Time Division Multiple Access (TDMA) approximately every 4.615 mSec. for approximately 0.577 mSec.

Turning on the RF transmitter every 4.615 mSec. creates transmitter current pulses, which can exceed 1 A, and an RF signal modulation envelope during a phone call at a repetition frequency of about 217 Hz (1000/4.615). The sharply rising and falling edges of the transmitter current pulses and the modulation envelope create a harmonic-rich signal at approximately 217 Hz which may be termed TDMA noise or buzz when the 217 Hz signal is coupled into the audio path and conducted to the speaker, earpiece, or microphone. When the 217 Hz signal is conducted to the microphone, the TDMA noise will be transmitted to the recipient of speech communication from the mobile device.

It is desirable to provide means for mitigating TDMA noise in GSM systems.

SUMMARY

Systems and methods for reducing effects of time-division multiplexing noise in mobile communications devices. When cellular communication with time-division multiplexing is detected, such as Global System for Mobiles (GSM) communication with Time Division Multiple Access (TDMA) protocol, total energy and energy at a repetition frequency of the time division multiplexing is measured in signals received from several microphones located in the device. One or more microphones are disabled based on a ratio of the energy at the repetition frequency to the total energy. All microphones may be disabled except for one microphone having a lowest ratio of the energy at the repetition frequency to the total energy. Microphones with total energy below a predetermined threshold may also be disabled. A control signal identifying disabled microphones may be provided to signal processing subsystems that receive signals from the microphones.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Single lines used to connect circuits in the figures may represent a single signal or several related signals. The represented signals may be analog or digital signals.

Figures 1, 2:
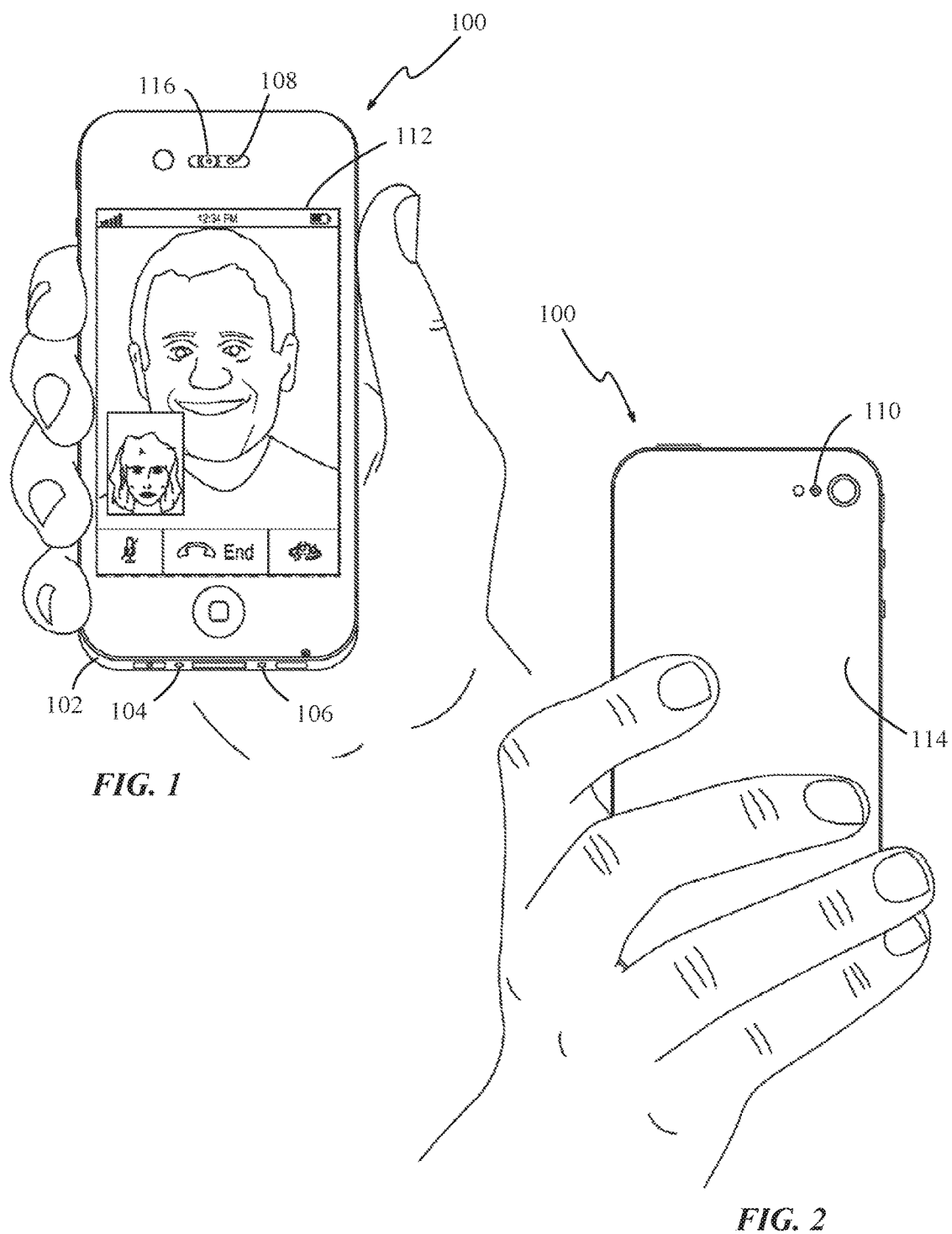
FIG. 1 is a view of a front face of an illustrative mobile cellular communications device while the device is running a video conferencing application.
FIG. 2 is a view of a rear face of the illustrative mobile cellular communications device.

FIG. 1 shows a mobile cellular communications device 100 (also referred to here as a mobile communications device or a mobile multi-function communications device) held in the hand of an end user (owner) of the device 100 with the front side visible. The mobile communications device 100 is a portable, personal apparatus that may be held in the hand and carried by a user during operation. In one instance, the device 100 is a smart phone or a cellular phone with several features typically available in modern wireless communication devices, such as a touch screen interface, music, video file recording, playback, digital camera, voice commands, and wireless-enabled applications such as voice over internet protocol telephony, video conferencing, electronic calendar, web browser, and email. In another instance, the device 100 may be a larger, tablet-like computer such as an iPad™ device or a laptop notebook such as a MacBook™ device by Apple Inc.

FIG. 2 shows the mobile cellular communications device 100 held in the hand of the end user with the back side visible. FIGS. 1 and 2 show some constituent hardware components of the mobile communications device 100, e.g. as found in an iPhone™ device by Apple Inc. The device 100 has a housing 102 in which the primary mechanism for visual and tactile interaction with its user is a touch sensitive display screen (referred to here as a touch screen) 112. The housing 102 may be essentially a solid volume referred to as candy bar or chocolate bar type as in the iPhone™ device. An alternative is one that has a moveable, multi-piece housing, such as a clamshell design, or one with a sliding, physical keypad. The touch screen 112 is used to display typical features of visual voicemail, web browser, email, and digital camera viewfinder, as well as others, and to receive input from the user via virtual buttons and touch commands.

The device 100 may include several microphones in the housing 102. The use of two or more microphones may allow for sound input from a variety of directions or sources, and/or implement features such as reduction of acoustic interference, microphone beam forming for directionally selective sound reception, and the like. The microphones may be any type of acoustic-to-electric transducer or sensor, including Micro Electrical-Mechanical System (MEMS) microphones, piezoelectric microphones, electret condenser microphones, or dynamic microphones. The microphones may be situated in different areas of the device 100 as described in more detail below.

In one embodiment, a first microphone 104 is located along a bottom side of the device 100. The first microphone 104 may be primarily used during voice calls to receive audio from a user of the device 100 while the user has the device 100 up to his ear.

In one embodiment, a second microphone 110 is located along a rear face or surface 114 of the device 100. The second microphone 110 may be used for beam forming operations as will be described in further detail below.

In one embodiment, a third microphone 108 is located on the front of the device. The third microphone 108 may be adjacent a speaker 116. The speaker may be used during voice calls to provide audio to the user of the device 100 while the user has the device 100 up to his ear. The third microphone 108 may be used during voice calls to provide a noise cancellation operations while the user has the device 100 up to his ear. The third microphone 108 may be used along with the second microphone 110 for beam forming operations when the device 100 is held away from the user's ear, as will be described in further detail below.

Additionally, by being located in a top portion of the device 100, the third microphone 108 may be less likely to be obstructed by the hand of the user while performing video conferencing, voice dictation, voice activation, or similar operations in which the user is speaking while holding the device 100 away from his ear. For example, during a video conference, a user typically grips a bottom portion of the device 100 such that a camera is facing the user. With this grip, the user's hand might be blocking the first microphone 104 which is located along the bottom side of the device 100, while the second microphone 110 is facing away from the user along the rear face 114 of the device 100. However, the third microphone 108 is unobstructed and can pick up the speech from the user.

When the mobile communications device 100 is used for cellular telephony, one or more of the device microphones 104, 106, 108, 110 are used to capture an audio signal to be transmitted by the cellular transmitter in the mobile device. The selection of the one or more of the device microphones 104, 106, 108, 110 to be used may be dependent on a variety of conditions, such as how the device is being held. For example, the selection of microphones may be different when the device is held to the ear of the user may be different from when the device is held for use as a speakerphone.

Figure 3:
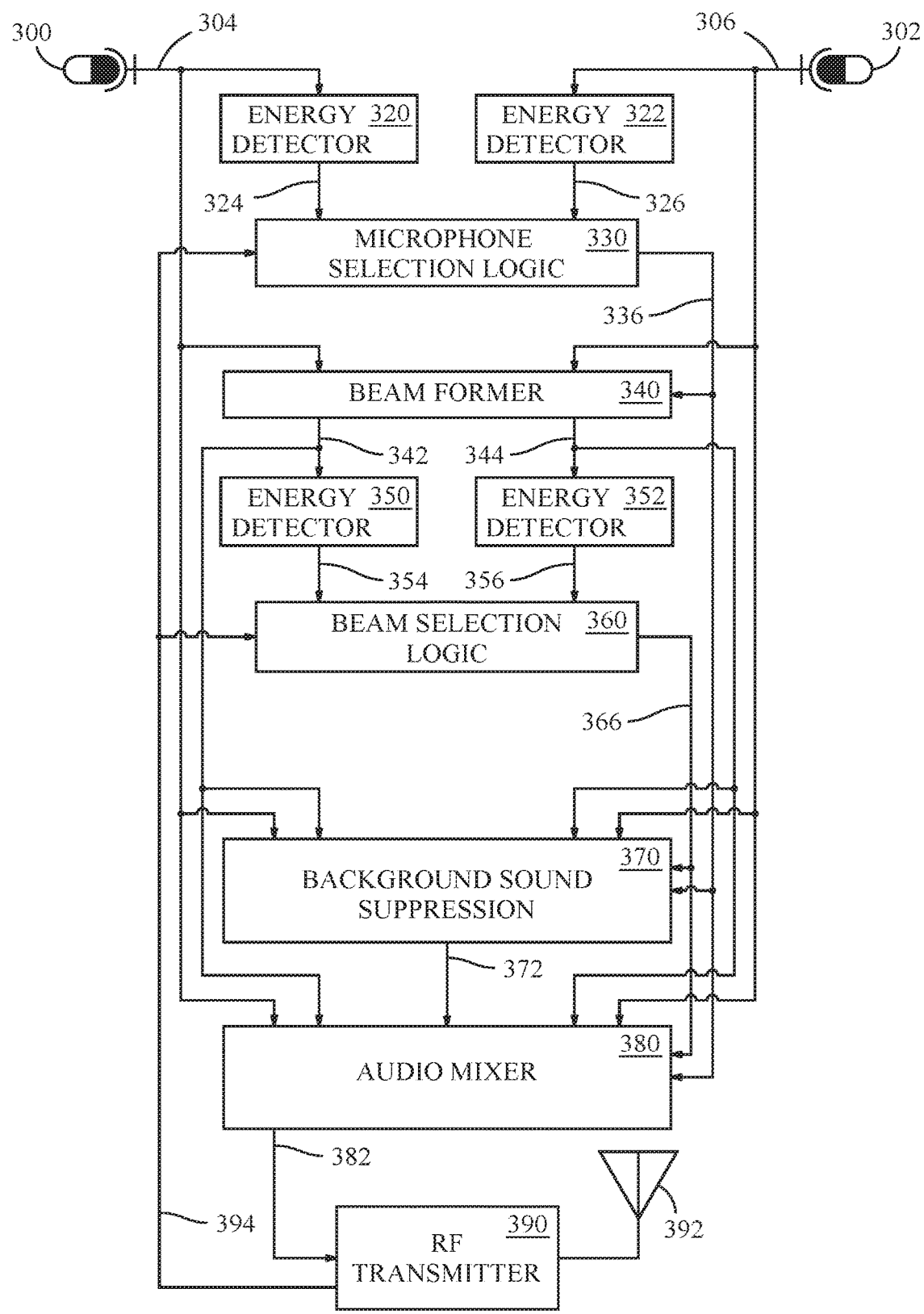
FIG. 3 is a block diagram of a portion of the circuitry that may be used to acquire and process audio signals from microphones in the mobile communications device.

FIG. 3 shows a simplified block diagram of a portion of the circuitry that may be used to acquire and process audio signals from microphones in a mobile communications device. Some circuitry and signal paths that are not need to explain the present invention are omitted for clarity, even though such circuitry and signal paths may be necessary to provide a functional mobile communications device.

Two microphones 300, 302 are shown. Additional microphones can be added to the device using similar circuitry to that for the microphones shown. The audio signal 304, 306 from each microphone 300, 302 may be amplified by a preamplifier (not shown) to provide an audio signal with electrical characteristic suitable for use in the balance of the audio processing circuitry.

The audio processing circuitry detects the use of cellular communication with Time Division Multiple Access (TDMA) multiplexing and activates portions of the circuitry for mitigating TDMA noise. In one embodiment, an RF transmitter 390 may provide a TDMA multiplexing signal 394 when time-division multiplexing is occurring. The following description describes the circuit operations when cellular communication with time-division multiplexing is detected.

Each of the audio signals 304, 306 is monitored by an energy detector circuit 320, 322 that measures the amount of energy contained in the audio signal. The energy detector circuit 320, 322 may provide a signal 324, 326 that indicates of the total energy and the energy in a repetition frequency of the time division multiplexing. The measured energy from the repetition frequency may include energy at the repetition frequency and energy at harmonics of the repetition frequency. When the cellular communication with time-division multiplexing is Global System for Mobiles (GSM) communication with Time Division Multiple Access (TDMA) protocol, the repetition frequency is approximately 217 Hz.

The measured energy signals 324, 326 for the audio signals 304, 306 are provided to a microphone selection logic circuit 330. The microphone selection logic circuit 330 determines which of the device microphones 300, 302 are most affected by TDMA noise. The logical operations performed by the microphone selection logic circuit 330 are described in detail below.

The audio signals 304, 306 may be provided to various audio processing subsystems such as a beam former circuit 340, a background suppression circuit 370, and an audio mixer circuit 380. The microphone selection logic circuit 330 may provide a control signal 336 to these audio processing subsystems that identifies the microphones 302, 304 that are affected by TDMA noise.

The beam former circuit 340 may use two or more audio signals 304, 306 that are judged to be reasonably free of TDMA noise to provide a more directional and steerable response to sound. The beam former circuit 340 provides one or more beam formed audio signals 342, 344 when the beam former circuit is active.

Each of the one or more beam formed audio signals 342, 344 may be monitored by an energy detector circuit 350, 352 that measures the amount of energy contained in the beam formed audio signal. The energy detector circuit 350, 352 may provide a signal 354, 356 that indicates of the total energy and the energy in a repetition frequency of the time division multiplexing. The measured energy from the repetition frequency may include energy at the repetition frequency and energy at harmonics of the repetition frequency. The beam formed audio signals 342, 344 may be significantly affected by TDMA noise even if the audio signals 304, 306 that are combined to create the beam formed audio signals are reasonably free of TDMA noise.

The measured energy signals 354, 356 for the beam formed audio signals 342, 344 are provided to a beam selection logic circuit 360. The microphone selection logic circuit 360 determines which of the beam formed audio signals 342, 344 are most affected by TDMA noise. The logical operations performed by the beam selection logic circuit 360 are described in detail below.

The beam formed audio signals 342, 344 may be provided to various audio processing subsystems such as a background suppression circuit 370 and an audio mixer circuit 380. The beam selection logic circuit 360 may provide a control signal 366 to these audio processing subsystems that identifies the beam formed audio signals 342, 344 that are affected by TDMA noise.

The background suppression circuit 370 may use two or more audio signals 302, 304 and/or beam formed audio signals 342, 344 to suppress unwanted background sounds. The background suppression circuit 370 provides an enhanced audio signal 372 when the background suppression circuit is active. While the enhanced audio signal 372 is shown as a single line for clarity, it will be appreciated that a background suppression circuit may provide more than one audio signal. The background suppression circuit 370 may use the control signal 336 provided by the microphone selection logic circuit 330 and/or the control signal 366 provided by the beam selection logic circuit 360 to select the audio signals 302, 304 and/or beam formed audio signals 342, 344 that are least affected by TDMA noise.

The audio mixer circuit 380 receives the audio signals 344, 346, the beam formed audio signals 342, 344, and the enhanced audio signal 372. The audio mixer circuit 380 may use the control signal 336 provided by the microphone selection logic circuit 330 and/or the control signal 366 provided by the beam selection logic circuit 360 to select the audio signals 302, 304 and/or beam formed audio signals 342, 344 that are least affected by TDMA noise. These received audio signals are selectively combined or mixed to produce a transmission audio signal 382 that is provided to an RF transmitter 390 for wireless cellular transmission from the device antenna 392. When the RF transmitter 390 is operated in a Time Division Multiple Access (TDMA) multiplexing mode, such as for Global System for Mobiles (GSM) communication, the RF transmitter will draw a large amount of current during the periodic transmission intervals and create TDMA noise as previously described.

It will be appreciated that the audio signals 302, 304 and/or beam formed audio signals 342, 344 may be routed in other ways than what is shown in FIG. 3, which should be viewed as but one example. There may be control lines between the beam former circuit 340, the background suppression circuit 370, and the audio mixer circuit 380 to control the processing of the audio signals that are not shown for clarity.

Figure 4:
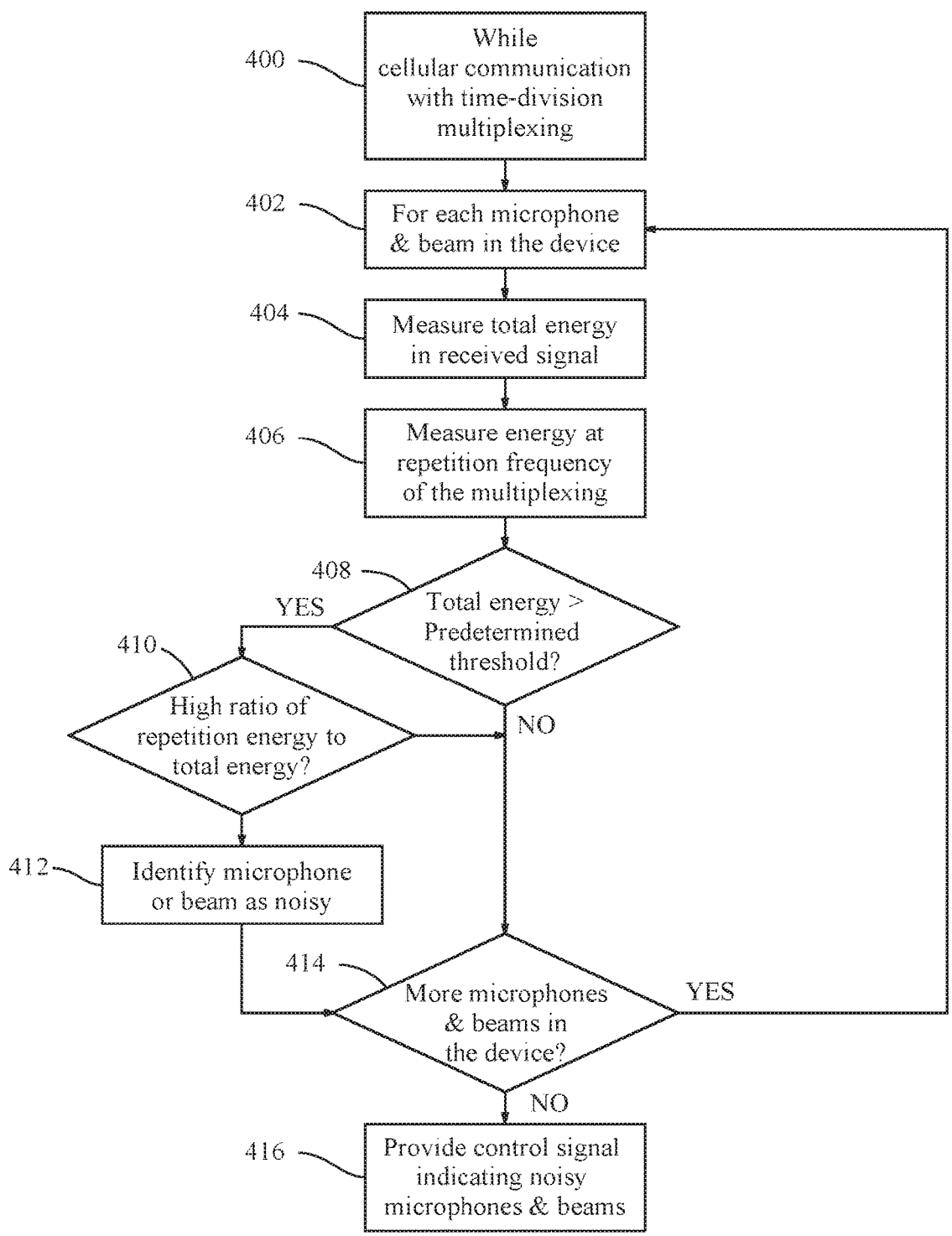
FIG. 4 is a flow chart that illustrates an exemplary logic that may be used to selectively disable the device microphones.

FIG. 4 is a flow chart that illustrates an exemplary logic that may be used by the microphone selection logic circuit 330 and/or the beam selection logic circuit 360 to identify the audio signals 302, 304 and/or beam formed audio signals 342, 344 that are affected by TDMA noise. The microphone selection logic circuit and the beam selection logic circuit operate while cellular communication with time-division multiplexing is detected 400. While the logic operations are shown as occurring sequentially, it will be appreciated that the logic operations may be performed in a different order than that shown and that one or more of the logic operations may be performed in parallel.

The following operations are performed for each microphone and formed beam in the device 402.

The total energy in the microphone's audio signal or the beam formed signal is measured 404. The energy at the multiplexing repetition frequency in the microphone's audio signal or the beam formed signal is measured 406. The measured energy from the repetition frequency may include energy at the repetition frequency and energy at harmonics of the repetition frequency. When the cellular communication with time-division multiplexing is Global System for Mobiles (GSM) communication with Time Division Multiple Access (TDMA) protocol, the repetition frequency is approximately 217 Hz.

The total energy in the microphone's audio signal may be compared to a predetermined threshold 408. An audio signal or beam formed signal with a low total energy 408-NO, such as an audio signal from a microphone that is covered by the user's hand, may not be evaluated further.

For an audio signal or beam formed signal with a total energy above the threshold 408—YES, a ratio of the energy at the multiplexing repetition frequency to the total energy is calculated 410 and used to identify the signal as affected by TDMA noise 412. Signals may be identified as affected by TDMA noise based on comparisons of the energy ratio to the energy ratios of other signals. In one embodiment, the signal having the highest ratio of the energy from the repetition frequency to the total energy, the noisiest signal, is the only signal identified as affected by TDMA noise. In another embodiment, all of the signals except for a signal having the lowest ratio of the energy from the repetition frequency to the total energy, the least noisy signal, are identified as affected by TDMA noise. In other embodiments, two or more noisiest or all but two or more least noisy signals are identified as affected by TDMA noise.

In some embodiments, the total energy in the audio signal or the beam formed signal is not compared to a predetermined threshold 408. The ratio of the energy at the multiplexing repetition frequency to the total energy is calculated 410 and used to identify the signal as affected by TDMA noise 412 for all signals regardless of the total energy in the signal.

The above operations will be repeated until all microphones in the device have been evaluated 414—YES. When all microphones in the device have been evaluated 414-NO, a control signal identifying noisy audio signals and/or beam formed signals may be provided to other device subsystems 416.

It will be appreciated that identifying noisy audio signals and/or beam formed signals based on comparisons of the energy ratio of a given signal to the energy ratios of other signals requires measurements and calculations for the other signals. If the operations are performed sequentially, as shown in FIG. 4, there will an initial iteration to evaluate all the audio signals and/or beam formed signals in the device. All signals may be identified as affected by TDMA noise to suppress use of the signals during the initial iteration. In some embodiments, the initial iteration may occur quickly enough that its effects are not perceptible to a user and it may not be necessary to identify any signals as affected by TDMA noise during the initial iteration.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A mobile communications device comprising:
   a plurality of microphones;
   energy detector circuits coupled to the plurality of microphones, the energy detector circuits configured to measure total energy in each of a plurality of audio signals received from the plurality of microphones and to measure energy from a repetition frequency of a time division multiplexing, when the mobile communications device is using cellular communication with time-division multiplexing; and
   a microphone selection logic circuit configured to
      identify one or more of the plurality of audio signals as affected by Time Division Multiple Access (TDMA) noise based on a ratio of the energy from the repetition frequency to the total energy when the mobile communications device is using cellular communication with time-division multiplexing, and
      provide a control signal that indicates the audio signals affected by TDMA noise to one or more signal processing subsystems that receive signals from the plurality of microphones.

2. The mobile communications device of claim 1 wherein the microphone selection logic circuit is further configured to identify one or more of the plurality of audio signals having a highest ratio of the energy from the repetition frequency to the total energy.

3. The mobile communications device of claim 1 wherein the microphone selection logic circuit is further configured to identify all of the plurality of audio signals except for an audio signal having a lowest ratio of the energy from the repetition frequency to the total energy.

4. The mobile communications device of claim 1 wherein the microphone selection logic circuit is further configured to:
   identify a subset of audio signals from the plurality of audio signals where the total energy is greater than a predetermined threshold;
   provide the control signal that further indicates all of the plurality of audio signals not in the subset of audio signals, and all of the subset of audio signals except for an audio signal in the subset of audio signals having a lowest ratio of the energy from the repetition frequency to the total energy.

5. The mobile communications device of claim 1 wherein the microphone selection logic circuit is further configured to:
   identify a subset of audio signals from the plurality of audio signals where the total energy is greater than a first predetermined threshold;
   provide the control signal that further indicates all of the plurality of audio signals not in the subset of audio signals, and all of the subset of audio signals where the ratio of the energy from the repetition frequency to the total energy is greater than a second predetermined threshold.

6. The mobile communications device of claim 1 wherein the energy from the repetition frequency includes energy at the repetition frequency and energy at harmonics of the repetition frequency.

7. The mobile communications device of claim 1 further comprising:
   a beam former circuit coupled to the plurality of microphones, the beam former circuit configured to combine two or more of the plurality of audio signals received from the plurality of microphones and produce one or more beam formed signals;
   energy detector circuits coupled to the one or more beam formed signals, the energy detector circuits configured to measure total energy in each of the one or more beam formed signals and to measure energy from the repetition frequency of the time division multiplexing, when the mobile communications device is using cellular communication with time-division multiplexing; and
   a beam selection logic circuit configured to
      identify one or more of the beam formed signals as affected by Time Division Multiple Access (TDMA) noise based on a ratio of the energy from the repetition frequency to the total energy when the mobile communications device is using cellular communication with time-division multiplexing, and
      provide the control signal that further indicates the beam formed signals affected by TDMA noise to one or more signal processing subsystems that receive beam formed signals from the beam former circuit.

8. The mobile communications device of claim 1 wherein the cellular communication with time-division multiplexing is Global System for Mobiles (GSM) communication with Time Division Multiple Access (TDMA) protocol.

9. A method in a mobile communications device, comprising:
   detecting the use of cellular communication with time-division multiplexing; and
   when cellular communication with time-division multiplexing is detected, measuring total energy in each of a plurality of audio signals received from a like plurality of microphones located in a housing of the mobile communications device, measuring energy from a repetition frequency of the time division multiplexing in each of the plurality of audio signals, and providing a control signal that indicates which audio signals of the plurality of audio signals are affected by TDMA noise based on a ratio of the energy from the repetition frequency to the total energy, to one or more signal processing subsystems that receive audio signals from the plurality of microphones.

10. The method of claim 9 wherein providing the control signal further comprises:

identifying one or more of the plurality of audio signals having a highest ratio of the energy from the repetition frequency to the total energy.

11. The method of claim 9 wherein providing the control signal further comprises:

identify all of the plurality of audio signals except for an audio signal having a lowest ratio of the energy from the repetition frequency to the total energy.

12. The method of claim 9 wherein providing the control signal further comprises:

identifying a subset of audio signals from the plurality of audio signals where the total energy is greater than a predetermined threshold;

indicating all of the plurality of audio signals not in the subset of audio signals; and indicating all of the subset of audio signals except for an audio signal in the subset of audio signals having a lowest ratio of the energy from the repetition frequency to the total energy.

13. The method of claim 9 wherein providing the control signal further comprises:

identifying a subset of audio signals from the plurality of audio signals where the total energy is greater than a first predetermined threshold;

indicating all of the plurality of audio signals not in the subset of audio signals; and indicating audio signals in the subset of audio signals where the ratio of the energy from the repetition frequency to the total energy is greater than a second predetermined threshold.

14. The method of claim 9 wherein the energy from the repetition frequency includes energy at the repetition frequency and energy at harmonics of the repetition frequency.

15. The method of claim 9 further comprising:

combining two or more of the plurality of audio signals received from the plurality of microphones to produce one or more beam formed signals;

when cellular communication with time-division multiplexing is detected, measuring total energy in each of the one or more beam formed signals, measuring energy from a repetition frequency of the time division multiplexing in each of the one or more beam formed signals, and providing the control signal that further indicates the beam formed signals affected by TDMA noise based on a ratio of the energy from the repetition frequency to the total energy to one or more signal processing subsystems that receive beam formed signals.

16. The method of claim 9 wherein the cellular communication with time-division multiplexing is Global System for Mobiles (GSM) communication with Time Division Multiple Access (TDMA) protocol.

17. A mobile communications device comprising:

means for measuring total energy in each of a plurality of audio signals received from a like plurality of microphones located in a housing of the mobile communications device when cellular communication with time-division multiplexing is detected;

means for measuring energy from a repetition frequency of the time division multiplexing in each of the plurality of audio signals when cellular communication with time-division multiplexing is detected; and means for providing a control signal that indicates the audio signals affected by TDMA noise based on a ratio of the energy from the repetition frequency to the total energy when cellular communication with time-division multiplexing is detected.

18. The mobile communications device of claim 17 wherein the means for providing a control signal further comprises:

means for identifying one or more of the plurality of audio signals having a highest ratio of the energy from the repetition frequency to the total energy.

19. The mobile communications device of claim 17 wherein the means for providing a control signal further comprises:

means for identifying all of the plurality of audio signals except for an audio signal having a lowest ratio of the energy from the repetition frequency to the total energy.

20. The mobile communications device of claim 17 wherein the means for providing a control signal further comprises:

means for identifying a subset of microphones audio signals from the plurality of audio signals where the total energy is greater than a predetermined threshold;

means for indicating all of the plurality of audio signals not in the subset of audio signals; and means for indicating all of the subset of audio signals except for an audio signal in the subset of audio signals having a lowest ratio of the energy from the repetition frequency to the total energy.

21. The mobile communications device of claim 17 wherein the means for providing a control signal further comprises:

means for identifying a subset of audio signals from the plurality of audio signals where the total energy is greater than a first predetermined threshold;

means for indicating all of the plurality of audio signals not in the subset of audio signals; and means for indicating audio signals in the subset of audio signals where the ratio of the energy from the repetition frequency to the total energy is greater than a second predetermined threshold.

22. The mobile communications device of claim 17 further comprising:

means for providing a control signal that identifies the one or more of the plurality of microphones that have been disabled to one or more signal processing subsystems that receive signals from the plurality of microphones;

means for combining two or more of the plurality of audio signals received from the plurality of microphones to produce one or more beam formed signals;

means for measuring total energy in each of the one or more beam formed signals when cellular communication with time-division multiplexing is detected;

means for measuring energy from a repetition frequency of the time division multiplexing in each of the one or more beam formed signals when cellular communication with time-division multiplexing is detected; and
means for providing the control signal that further indicates the beam formed signals affected by TDMA noise based on a ratio of the energy from the repetition frequency to the total energy to one or more signal processing subsystems that receive beam formed signals when cellular communication with time-division multiplexing is detected.

* * * * *